2,897,595
PORCELAIN TYPE DENTURE COMPOSITION

Pyungtoo William Lee, York, Pa., assignor to The Dentists' Supply Company of New York, York, Pa., a corporation of New York No Drawing. Application May 1, 1956
Serial No. 582,041

12 Claims. (Cl. 32—8)

This invention relates to improvements in porcelain-type dental compositions and more particularly to compositions suitable for use in the making of dental articles such as artificial porcelain teeth, porcelain jacket crowns, porcelain tooth facings, and the like. Primarily, the present invention comprises an improvement over the invention described and claimed in Patent No. 2,443,318, dated June 15, 1948, the present applicant being one of the original patentees.

The principal object of the invention described and claimed in the aforementioned patent was to produce a porcelain-type dental composition which was substantially more resistant to thermal shock than conventional porcelain dental items, i.e., artificial teeth made principally from feldspathic material. As stated in said patent, it was found that increases in thermal shock resistance could be produced by using non-crystalline or amorphous silica, or compositions predominately comprising such material, suitable fluxing and shade producing ingredients also being included in the composition.

While teeth and similar dental articles produced in accordance with the principles of the invention covered by said Patent No. 2,443,318 were desirably increased in resistance to thermal shock over predominately feldspathic dental articles, such increase was obtained at the expense of reducing the modulus of rupture and thereby rendering the teeth far weaker in transverse or flexural strength than conventional, predominately feldspathic teeth. In fact, teeth made in accordance with said patent disclosure, and particularly anterior teeth having metallic pin anchorages, have a transverse or flexural strength only on the order of approximately 30% of pin-type anterior teeth made from a predominately feldspathic composition. Due to this deficiency, said invention has not been suitable for the manufacture of anterior teeth and particularly anterior pin-type teeth, although posterior, non-pin or diatoric teeth have been made with limited success in accordance with said patent. This, however, is due largely to the fact that posterior artificial teeth are not subjected to as great an amount of transverse or flexural strain in the mouth as anterior teeth.

One of the principal advantages of producing teeth with high resistance to thermal shock is that such teeth may be ground readily with an abrasive stone. For example, grinding may take place without any great danger of cracks occurring in the teeth, facings or the like as a result of frictional heat generated during the grinding operaiton. Unfortunately, the composition described in the previous patent was limited, because of reduced strength, to use in posteriors for full-denture use where grindability was a minimum asset.

It is a recognized fact that teeth used in fixed bridgework and partial dentures must frequently be altered in one or more aspects to be adapted exactly to the space to be occupied and that grindability would be a distinct asset in teeth so utilized. Due to the more secure anchorage of fixed bridgework, greater biting forces may be applied and the value of the previous invention could not be realized or applied due to its inherent weakness.

Another instance where grindability is highly desirable in a tooth is in anteriors. These "front" teeth are the only teeth clearly seen in the mouth and it is frequently desirable in producing natural esthetics to grind the incisal edge to resemble a worn condition which would exist on a corresponding natural tooth for a patient of a certain age. Again, the articles produced under the prior patent disclosure could not realize the advantage of their grindable composition because their weakness prevented use in anterior pin-retention forms.

Also, it will be seen by reference to the aforementioned patent that the preferred procedure for producing artificial porcelain teeth previously has been to form a flux initially, preferably comprising substantially equal parts of (a) fritted ground feldspar, and (b) a ground product of fusion of the following mixture of ingredients:

(1) 50% commercial magnesium silicate, anhydrous.
(2) 39% kaolin.
(3) 11% $B_2O_3$.

Said ground feldspar and ground product of fusion were mixed together and subjected to heat sufficient to fuse the same. The fluxed mass was rendered suitably homogeneous or uniform and, after solidification, ground to a particle size sufficient to pass a 170 mesh sieve.

The ground flux product described above was added in a range of proportions, specified in said patent, to vitreous silica or preferably a high-silica, borosilicate glass of which one commercial brand is known as "Vycor." Said "Vycor" glass was ground to a desirable degree of fineness and mixed with said ground flux. The more effective compositions for use in molding teeth therefrom had been found to require a minimum silica glass content of approximately 75%, with the general range embracing approximately 75% to approximately 95%. The flux described above substantially constituted the remainder and comprised approximately 25% to approximately 5% of the composition.

Not only did a dental product made with the foregoing patented composition have inadequate transverse or flexural strength, but the necessary fusing temperature also was of the order of 2400°–2500° F. which was substantially higher than that required for fusing or vitrifying feldspathic teeth. This relatively high temperature was required especially to minimize the possibility of devitrification or recrystallization occurring upon re-firing of dental products as required, for example, for staining and glazing purposes. The temperatures required to fuse conventional feldspathic dental products, for example, are of the order of 2200° to 2350° F. Also, while dental products formed in accordance with said patent yield great resistance to thermal shock, actually, the resistance afforded is substantially in excess of that required for conventional dental prosthetic operations.

It is a principal object of the present invention to overcome the shortcomings and undesirable aspects and characteristics both of conventional, predominantly feldspathic dental article, and also of dental articles made in accordance with the invention covered by the aforementioned patent, yet permit the production of dental articles having the desirable features of the prior invention such as the provision of resistance to thermal shock substantially in excess of that of conventional feldspathic dental products.

It also is among the objectives of this invention not only to retain desirable resistance to thermal shock, but also to increase very substantially the transverse or flexural strength of dental articles made in accordance with the present invention, minimize the occurrence of devitrification when re-fused, and simplify the processes by which the same are formed as compared with the prior invention, thereby rendering it possible to form not only posterior teeth, but satisfactory anterior, pin-type teeth, having transverse or flexural strength equal to or greater than that of feldspathic teeth.

The objectives are primarily attained by using certain proportions of vitreous silica materials, of which "Vycor" is one example, and flux compositions; using an alkaline-earth type flux rather than a borax-type flux; utilizing extremely fine feldspathic material in the flux; and, additionally, prestressing the dental articles which also embody the principles of the present invention by means of varying coefficients of thermal expansion.

Further, it is extremely surprising that a very low-expansion, ceramic composition, like a grindable porcelain, and an extremely high-expansion metal, like a precious metal pin coil anchorage, which are obviously and inherently incompatible, could ever be made so as to co-exist in a strong pin-type tooth. The strength increases accompanying the presently invented porcelain are, however, so remarkable that this very desirable end has been unexpectedly accomplished.

While it is conceivable that the principles of the present invention can be adapted to produce porcelain-type dental articles in which the composition comprises principally vitreous silica and a relatively minor portion of flux, the comparatively lower cost of a certain borosilicate glass sold under the trade name "Vycor" (which comprises approximately 96% vitreous silica and certain fluxes including boric oxide) is preferred for use in producing dental articles embodying the principles of the present invention. However, it is to be understood that the principles of the present invention are applicable to other types of vitreous silica glass mixed with appropriate flux compounds even though the cost of such glasses presently is considerably in excess of the cost of "Vycor."

It has been found that a completely satisfactory amount of resistance to thermal shock may be provided in porcelain-like dental articles embodying the present invention if the amount of vitreous silica therein, such as "Vycor," is reduced substantially over the percentage utilized in the porcelain mixes described and claimed in the aforementioned patent, as will be evident from the formulations of the present invention set forth hereinafter.

The preferred optimum formulas as well as the ranges of the formulas for both the enamel and body simulating mixtures of materials which are preferred in practicing the present invention are set forth below in Table A.

TABLE A

*Tooth composition formulation*

|  | Enamel, Preferred | Body, Preferred | Body and Enamel, Range |
|---|---|---|---|
|  | Percent | Percent | Percent |
| "Vycor" | 58.0 | 53.0 | 40.0–70.0 |
| Feldspar | 36.0 | 40.0 | 20.0–55.0 |
| Frit | 4.0 | 4.0 | 1.0–10.0 |
| Kaolin | 1.0 | 2.0 | .5– 4.0 |
| $Al_2O_3$ | 1.0 | 1.0 | .5– 3.0 |

It was understood, of course, that although not specifically recited in the formulas of Table A, it is intended that small amounts of coloring pigments, such as certain conventional metallic oxide, also will be included to produce the desired shades in the dental articles embodying the formulas and ranges set forth. Also, other desirable additions such as fluorescent imparting compositions or ingredients may be added to further increase the desirability of dental articles such as tooth products embodying the present invention.

The preferred formulation of frit for use in the tooth composition formulation set forth in Table A above is as follows:

TABLE B

*Frit composition*

|  | Preferred, percent | Range, percent |
|---|---|---|
| "Vycor" | 64.0 | 85.0– 1.0 |
| $SiO_2$ | 15.8 | 10.0–44.0 |
| $Al_2O_3$ | 6.1 | 2.0–15.0 |
| $K_2O$ | 2.4 | 1.0–10.0 |
| $Na_2O$ | .7 | 0.0– 5.0 |
| MgO | 3.5 | 1.0–10.0 |
| $B_2O_3$ | 3.5 | 1.0–15.0 |
|  | 96.0 |  |

Table C details the complete ceramic composition of the low-melting, flux phase necessary to properly interact with the high melting ingredients (including silica glass), and comprises the combined composition of "feldspar" and "frit" as detailed in Table A.

TABLE C

*Combined composition of flux phase*

|  | Preferred, percent | Range, percent |
|---|---|---|
| $SiO_2$ | 60.0 | 40.0–70.0 |
| "Vycor" | 8.0 | 5.0–15.0 |
| $Al_2O_3$ | 17.5 | 15.0–25.0 |
| $K_2O$ | 10.9 | 7.0–15.0 |
| $Na_2O$ | 2.5 | 1.0– 8.0 |
| MgO | .5 | .1– 2.0 |
| $B_2O_3$ | .5 | .1– 2.0 |

In the foregoing frit and flux compositions, the metallic oxides and boric acid serve in a fluxing capacity for each other and the "Vycor." Said combined mixture, of course, serves principally as a flux for the bulk of the "Vycor" in the tooth forming compositions set forth in Table A.

With the exception of the "Vycor," MgO and $B_2O_3$ ingredients of the frit composition in Table B, the oxides principally are obtained from feldspar and kaolin of analysis and proportion to yield the percentages of the individual ingredients of flux composition set forth in Table C.

In preparing the frit composition set forth in Table B, the "Vycor," magnesium oxide, boric acid, and some of the feldspar and kaolin preferably are mixed, fritted, ground and sifted to pass at least a 325 mesh screen. Even greater fineness is preferred. Additional raw feldspar which is even finer is also added to the above frit to produce the complete, composite flux phase. The desired fineness of raw feldspar is obtained by a flotation process, all of the particles being less than 40 microns in size and preferably 50% of these spar particles being smaller than 5 microns. Additional kaolin and alumina ($Al_2O_3$) are reduced to fine size and sifted through a suitable screen to yield −300 mesh size and are mixed in a raw state with the sifted flux material of Table C.

The control of the grain size of the flux is especially vital to prevent any appreciable amount of devitrification or recrystallization of the porcelain, for example, after dental articles are made therefrom and are submitted to refiring as may be required in staining and glazing. In conventional feldspathic dental articles, it is desired to have at least some coarse particle fraction of feldspathic material in the compositions, particularly for purposes of producing translucency of a desired degree when the dental articles are fired in the presence of air. However, unlike these articles, the desired effect of minimizing of devitrification or recrystallization under the present invention is not obtainable if a coarser fraction of feldspathic material is used than has been set forth above, the coarsest particles preferably not exceeding 40 microns. It has been found that by using feldspathic material of the ranges of fineness set forth above the composition of the body and enamel-simulating layer or layers may be varied relatively with greater freedom than was possible with the compositions described in the aforementioned patent, and yet afford minimum devitrification when the dental articles are refired.

In addition to the foregoing, when the dental articles to be manufactured have two or more parts, such as the enamel layer and one or more dentine-simulating portions, it is possible to increase further the transverse or flexural strength of such dental articles if pre-stressing of the articles is accomplished by relatively varying the "Vycor" and flux ratios of the several portions of the dental articles, so as to change the coefficients of thermal expansion of said several portions. For example, in a two-part tooth these results are obtained desirably if the enamel should have approximately 5% more "Vycor" and correspondingly 5% less flux than the body composition. In a three-part tooth, wherein the body and enamel layer have a middle insert or body inserted therebetween, an even better pre-stressing is obtained if the outer layer of enamel has approximately 10% more "Vycor" than the body and 10% less flux, while the intermediate layer or middle insert or body will have approximately 5% more "Vycor" than the body and 5% less flux than the body.

Such pre-stressing vastly increases even the improved transverse or flexural strength (modulus of rupture) newly obtained by utilization of the three factors; (1) use of a smaller percentage of "Vycor" than in the aforementioned patent, (2) change of the flux from predominantly a borox flux to predominantly alkali-earth flux, and (3) the use of very fine grain sizes of feldspathic material in the flux. For example, teeth made under the aforementioned patent might fail with a 5 to 10 pound pull on the pin anchorage. By the use of three factors enumerated above, the transverse or flexural strength of the teeth may be increased to withstand between 15 to 20 pounds pull on the pin anchorage before it fails. Hence, it is seen that the use of these first three factors alone increases the transverse or flexural strength substantially in that, in general, it is more than doubled. However, a still further doubling of even this transverse or flexural strength of such dental articles is possible by pre-stressing it since such pre-stressing develops in the teeth a transverse or flexural strength on the order of 45 pounds.

From the foregoing, therefore, it is seen that the present invention provides formulas both as to intermediate compositions and as to tooth compositions, and processes for compounding the same, the tooth compositions and flux compositions both preferably including high-silica glass of which "Vycor" is a preferred type. Proportions of said glass and flux are so selected as to produce a strong dental article also highly resistant to devitrification or recrystallization when the dental article is refired. The strength characteristic is obtained by the decreasing of the "Vycor" content of the mixtures used as compared with the "Vycor" content of teeth made in accordance with the invention covered by said aforementioned patent, as well as the changing of the flux from a predominantly borax flux to a predominantly alkali-earth type flux, the use of very fine grain sizes of feldspar in the flux, and the innovation of pre-stressing controlled by variations in the ratio of "Vycor" to flux. The extent of this strength increase is sufficient to render feasible the use of this type porcelain with desirable types of metal pin anchorages in spite of the obvious and previously intolerable discrepancy in expansion characteristics between metal and porcelain. The firing temperature has been desirably reduced by the use of very fine grained fluxes of an alkaline-earth type, which also permits reductions in "Vycor" content. The final product has been stabilized against appreciable recrystallization by chemical changes of the flux phase, physical effects of reduced particle size of flux, and the possible use of super-heat beyond that necessary for minimum fusion.

While the invention has been described in its several preferred embodiments, and has included certain details, it should be understood that the invention is not to be limited to the precise details herein illustrated and described since the same may be carried out in other ways falling within the scope of the invention as claimed.

I claim:

1. A ceramic composition adapted for dental prosthesis comprising not over 70% by weight of high silica glass comparatively free from other substances, the remainder comprising essentially a powdered feldspathic flux material not over approximately 40 microns in size.

2. A ceramic composition adapted for dental prosthesis and comprising essentially not over 10% of a fritted mixture principally having alkaline earth type fluxing characteristics, between 20 and 55% finely divided feldspathic flux, and the remainder being high silica glass, all percentages being by weight.

3. A ceramic composition adapted for dental prosthesis and comprising essentially approximately 4% of a fritted mixture principally having alkaline earth type fluxing characteristics, between 20 and 55% finely divided feldspathic flux, and the remainder being high silica glass, all percentages being by weight.

4. A ceramic composition adapted for dental prosthesis and comprising essentially approximately 4% of a fritted mixture principally having alkaline earth type fluxing characteristics, between approximately 36 and 40% finely divided feldspathic flux, and the remainder being high silica glass, all percentages being by weight.

5. A ceramic composition adapted for dental prosthesis and comprising essentially not over 10% of a finely divided fritted mixture principally having alkaline earth type fluxing characteristics, between 20 and 55% feldspathic flux not over 40 microns in size, and the remainder being high silica glass, all percentages being by weight.

6. A composite artificial tooth including a body portion united to an enamel layer simulating portion, said portions being formed from ceramic compositions comprising not over 70% by weight of high silica glass comparatively free from other substances, the remainder comprising essentially a flux and the ratio of glass to flux being approximately 5% higher in the enamel layer than in the body portion.

7. A composite artificial tooth including a body portion united to an enamel layer simulating portion, said portions being formed from ceramic compositions comprising between 40 and 70% by weight of high silica glass comparatively free from other substances, the remainder comprising essentially a flux and the ratio of glass to flux being approximately 5% higher in the enamel layer than in the body portion.

8. A composite artificial tooth including a body portion united to an enamel layer simulating portion, said portions being formed from ceramic compositions comprising between 53 and 58% by weight of high silica glass comparatively free from other substances, the remainder comprising essentially a flux and the ratio of glass to flux being approximately 5% higher in the enamel layer than in the body portion.

9. A composite artificial tooth including a body portion united to an enamel layer simulating portion, said portions being formed from ceramic compositions comprising essentially approximately 4% of a fritted mixture characterized by being of an alkaline earth type flux, between 36 and 40% highly pulverized feldspathic flux, and the remainder a high silica glass comparatively free from other substances, the ratio of glass to flux being approximately 5% higher in the enamel layer than in the body portion.

10. A composite artificial tooth including a body portion united to an enamel layer simulating portion, said portions being formed from ceramic compositions comprising not over 70% by weight of high silica glass comparatively free from other substances, the remainder comprising essentially a flux of which feldspathic particles not over 40 microns in size constitute the major portion and the ratio of glass to flux is a few percent different in the enamel layer from that in the body portion to provide pre-stressing in said tooth.

11. A composite artificial tooth including a body portion united to an enamel layer simulating portion, said portions being formed from ceramic compositions comprising essentially between 36 and 40% feldspathic flux not over 40 microns in size, and the remainder principally high silica glass comparatively free from other substances, the ratio of glass to flux being slightly higher in the enamel layer than in the body portion to provide pre-stressing in said tooth.

12. A composite artificial tooth including a body portion united to an enamel layer simulating portion, said portions being formed from ceramic compositions comprising essentially between 53 and 58% by weight of high silica glass comparatively free from other substances, and a flux of which all but between 1 and 10% comprises feldspathic particles not over 40 microns in size, the ratio of glass to flux being slightly different in the enamel layer from that in the body portion to provide pre-stressing in said tooth.

References Cited in the file of this patent

UNITED STATES PATENTS

| 2,341,998 | Lee et al. | Feb. 15, 1944 |
| 2,443,318 | Lee et al. | June 15, 1948 |

FOREIGN PATENTS

| 721,492 | Great Britain | Jan. 5, 1955 |